(12) United States Patent
George

(10) Patent No.: US 7,310,659 B1
(45) Date of Patent: Dec. 18, 2007

(54) INTERFACE AND METHOD FOR EXTENDING A TARGET APPLICATION OVER AN INSTANT MESSAGE LINK OF A COMMUNICATION NETWORK

(75) Inventor: Kenneth V. George, Houston, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 897 days.

(21) Appl. No.: 10/696,099

(22) Filed: Oct. 29, 2003

Related U.S. Application Data

(60) Provisional application No. 60/483,388, filed on Jun. 27, 2003.

(51) Int. Cl.
*G06F 15/16* (2006.01)

(52) U.S. Cl. .................. 709/206; 709/246; 719/328

(58) Field of Classification Search ............ 709/206, 709/231, 246; 719/328, 329; 370/466; 455/466; 715/523

See application file for complete search history.

(56) References Cited

U.S. PATENT DOCUMENTS

| | | | |
|---|---|---|---|
| 6,321,257 B1 * | 11/2001 | Kotola et al. ............... | 709/219 |
| 6,463,078 B1 | 10/2002 | Engstrom et al. | |
| 6,516,356 B1 | 2/2003 | Belknap et al. | |
| 6,549,937 B1 * | 4/2003 | Auerbach et al. ........... | 709/206 |
| 6,629,130 B2 * | 9/2003 | Mertama et al. ............ | 709/206 |
| 7,058,036 B1 * | 6/2006 | Yu et al. ..................... | 370/335 |
| 2002/0035605 A1 * | 3/2002 | McDowell et al. ......... | 709/206 |
| 2003/0023773 A1 * | 1/2003 | Lee et al. ................... | 709/328 |
| 2003/0093480 A1 | 5/2003 | Lagarde et al. | |
| 2003/0126213 A1 | 7/2003 | Betzler | |
| 2004/0054740 A1 * | 3/2004 | Daigle et al. ............... | 709/206 |
| 2004/0064696 A1 * | 4/2004 | Daigle et al. ............... | 713/168 |
| 2004/0167986 A1 * | 8/2004 | Gilfix et al. ................ | 709/230 |

OTHER PUBLICATIONS

Extensible Messaging and Presence Protocol (xmpp), found at www.ietf.org/html.charters/xmpp-charter.html (The Internet Engineering Task Force website), Chairs: Pete Resnick and Lisa Dusseault, Applications Area Directors: Ned Freed and Ted Hardie, 3 pages.

JEP-0004: Data Gathering and Reporting, found at www.jabber.org/jeps/jep-0004.html (The Jabber SoftwareFoundation website), Authors: Ryan Eatmon, Joe Hildebrand, Jeremie Miller and Thomas Muldowney, copyright 1999-2003, 26 pages.

* cited by examiner

*Primary Examiner*—Abdullahi Salad

(57) ABSTRACT

An instant message (IM) interface configured to extend a target application over an IM link of a communication network is provided according to the invention. The IM interface includes a communication interface configured to transfer a reply IM to an originating application. The IM interface further includes a processing system configured to obtain data from the target application and provide an output form to a messaging Application Programming Interface (messaging API). The output form is provided from a set of Forms Definition Language (FDL) forms. The messaging API is substantially protocol-dependent and the set of FDL forms is protocol-independent. The processing system is further configured to generate the reply IM in an originating application protocol using the data, the output form, and one or more protocol-specific libraries of the messaging API. The reply IM is an originating application protocol-specific IM.

29 Claims, 8 Drawing Sheets

INTERFACE AND METHOD FOR EXTENDING A TARGET APPLICATION OVER AN INSTANT MESSAGE LINK OF A COMMUNICATION NETWORK

RELATED APPLICATIONS

This application claims the benefit of U.S. Provisional Application No. 60/483,388, filed Jun. 27, 2003.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to an instant message (IM) interface and method for extending a target application over an IM link.

2. Description of the Prior Art

Modern communication devices have been developed with many advanced capabilities. One example is a telephone that is capable of communicating over wires or wirelessly. Other communication devices include computers and portable computers, pagers, portable digital assistants (PDAs), etc. Such communication devices are capable of sending and receiving voice and text communications, and can transfer data wirelessly or over one or more wires.

The increasing capabilities of communication devices have resulted in an increased demand for data exchange. For example, a communication device can be used to request employee data, such as from an employee directory. A relatively instant data exchange can enhance communications, enable better decision-making, and boost productivity. Data exchange is most beneficial when the desired data is remote, and an electronic data exchange quickly and efficiently obtains the desired data.

Instant Message (IM) is a type of communication wherein a source device signals a destination device with a message and receives a response substantially in real time. For packet networks (i.e., computer networks), instant messages travel substantially instantly to the computer device of the recipient. The recipient receives the message and can generate and send a response, also in substantially real time. For switched networks, such as wireline and wireless telephone networks, an instant message can be transmitted from the source to destination using a signaling channel, also substantially in real time. IM typically transfers relatively small, simple messages, such as a text message.

A relatively new prior art development in communications technology is the use of IM for exchanging data between a communication device and a target application over a communication network. An instant message is created and formatted according to the protocol utilized by the target application. The message is transferred to the target application substantially in real time, and the target application responds with requested data and/or a requested operation, also substantially in real time.

However, this prior art approach has drawbacks. The originating application on the communication device must create the message in a proper protocol for the target application. In order to do this, the prior art approach has been to create or modify the originating application in the protocol of the target application. Therefore, an originating application will perform transactions only with a known target application. New originating applications that are later installed on the communication device may not work with the target application and may require modification by a developer. In addition, if the user desires to communicate with new target applications, the originating application will need to be modified in an appropriate manner. An originating application on the communication device must therefore be modified to achieve the protocol of a target application. In addition, the communication device in the prior art may need to be modified for each target application.

SUMMARY OF THE INVENTION

The invention helps solve the above problems.

An instant message (IM) interface is provided according to an embodiment of the invention and is configured to extend a target application over an IM link of a communication network. The IM interface comprises a communication interface configured to transfer a reply IM to an originating application. The IM interface further comprises a processing system configured to obtain data from the target application and provide an output form to a messaging Application Programming Interface (messaging API). The output form is provided from a set of Forms Definition Language (FDL) forms. The messaging API is substantially protocol-dependent and the set of FDL forms is protocol-independent. The processing system is further configured to generate the reply IM in an originating application protocol using the data, the output form, and one or more protocol-specific libraries of the messaging API. The reply IM comprises an originating application protocol-specific IM.

A method for extending a target application over an IM link of a communication network is provided according to an embodiment of the invention. The method comprises obtaining data from the target application and providing an output form to a messaging Application Programming Interface (messaging API). The output form is provided from a set of Forms Definition Language (FDL) forms. The messaging API is substantially protocol-dependent and the set of FDL forms is protocol-independent. The method further comprises generating a reply IM in an originating application protocol using the data, the output form, and one or more protocol-specific libraries of the messaging API. The reply IM comprises an originating application protocol-specific instant message. The method further comprises transferring the reply IM to the originating application.

A method for extending a target application over an IM link of a communication network is provided according to an embodiment of the invention. The method comprises receiving an IM in a messaging Application Programming Interface (messaging API) from an originating application, with the IM requesting a target application transaction. The method further comprises obtaining data requested in the IM. The method further comprises providing an output form to the messaging API. The output form is provided from a set of Forms Definition Language (FDL) forms. The messaging API is substantially protocol-dependent and the set of FDL forms is protocol-independent. The method further comprises generating a reply IM in an originating application protocol using the data, the output form, and one or more protocol-specific libraries of the messaging API. The reply IM comprises an originating application protocol-specific instant message. The method further comprises transferring the reply IM to the originating application.

A method for extending a target application over an IM link of a communication network is provided according to an embodiment of the invention. The method comprises receiving a first IM in a messaging Application Programming Interface (messaging API) from an originating application. The first IM requests a target application transaction. The method further comprises selecting an input form in the messaging API from a set of Forms Definition Language (FDL) forms in response to the first IM. The messaging API is substantially protocol-dependent and the set of FDL forms is protocol-independent. The method further comprises generating an input request form IM in the messaging API using the input form and one or more protocol-specific libraries. The input request form IM requests and accepts input data related to the target application transaction. The method further comprises transferring the input request form IM to the originating application, receiving a second IM in the messaging API in response to the input request form IM, and obtaining data requested in the second IM. The method further comprises providing an output form to the messaging API. The output form is provided from the set of FDL forms. The method further comprises generating a reply IM in an originating application protocol using the data, the output form, and the one or more protocol-specific libraries of the messaging API. The reply IM comprises an originating application protocol-specific instant message. The method further comprises transferring the reply IM to the originating application.

BRIEF DESCRIPTION OF THE DRAWINGS

The same reference number represents the same element on all drawings.

DETAILED DESCRIPTION OF THE PREFERRED EMBODIMENT

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
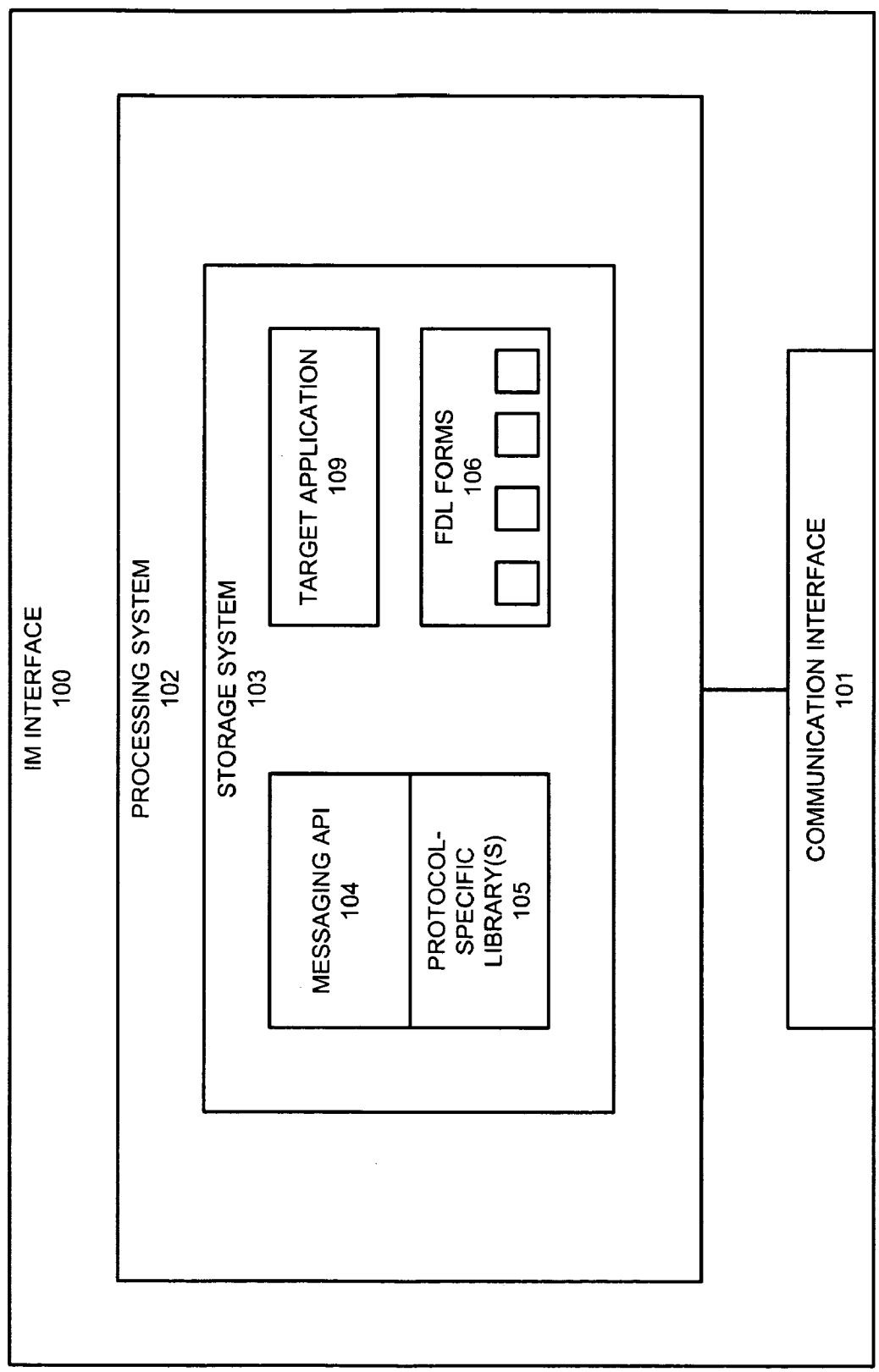
FIG. 1 shows an instant message (IM) interface according to an embodiment of the invention.

FIG. 1 shows an instant message (IM) interface 100 according to an embodiment of the invention. The IM interface 100 includes a communication interface 101 and a processing system 102. The processing system 102 includes a messaging Application Programming Interface (messaging API) 104, a protocol-specific library(s) 105, and a set of Forms Definition Language (FDL) forms 106. The processing system 102 can also optionally include a target application 201 (see FIG. 2 and the accompanying discussion). The above components can be stored in a storage system 103.

Figure 2:
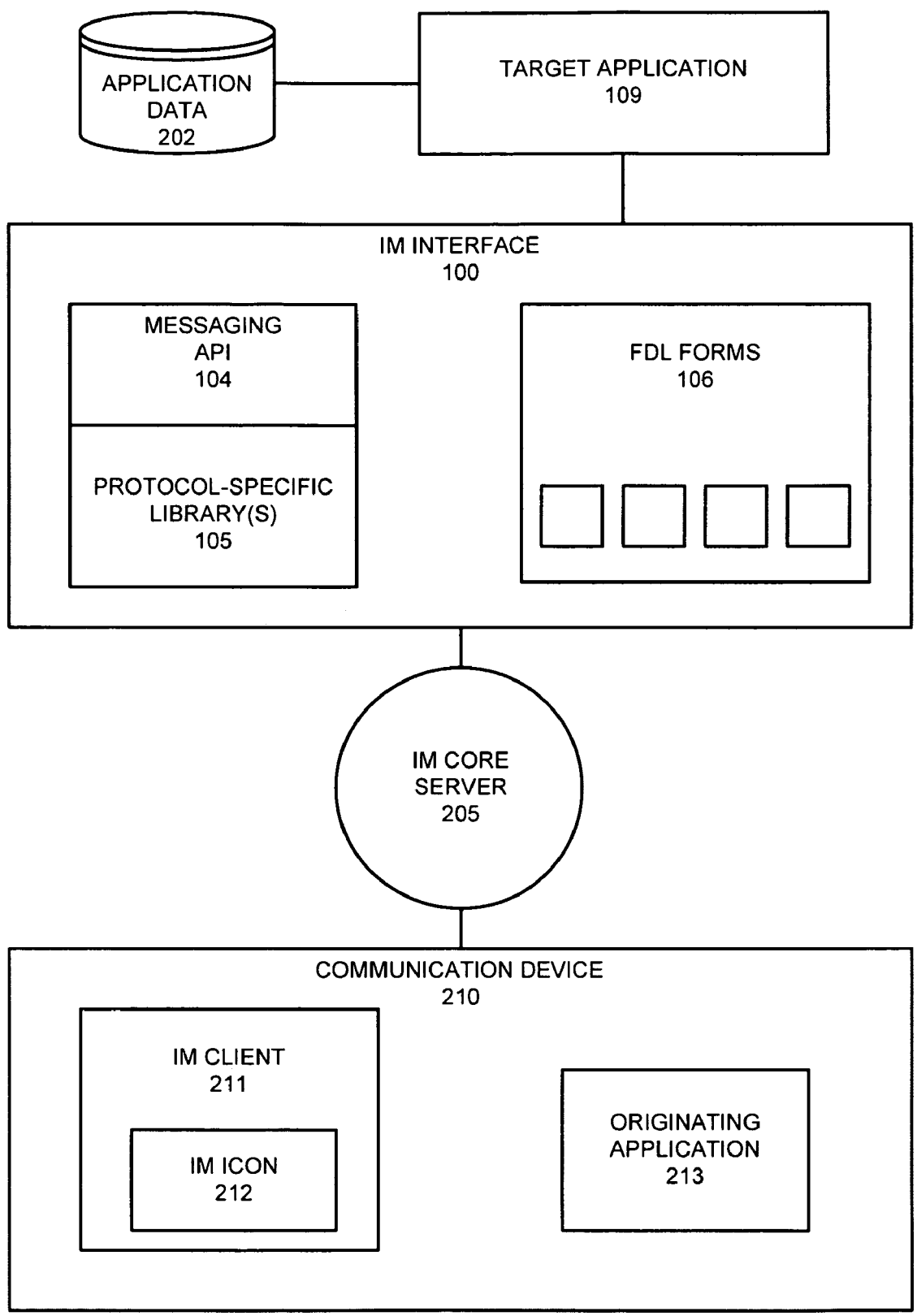
FIG. 2 shows a communication system according to an embodiment of the invention.

Referring to FIGS. 1-2, the IM interface 100 enables a target software application 201 to be extended to a computerized device, such as a communication device 210. The IM interface 100 enables the communication device 210 to interact with and obtain information from the target application 109 in a protocol-independent manner. The target application 109 can be accessed in order to obtain and/or exchange information. For example, the IM interface 100 enables a mobile communication device to interact with and obtain information from an information server application. The IM interface 100 can enable communication with multiple target applications. The operation of the IM interface 100 will be discussed in more detail in the text accompanying FIG. 2.

The communication interface 101 is configured to conduct communications with an IM core server 205 and one or more target applications 201. The communication interface 101 can receive and transfer instant messages. For example, the communication interface 101 can receive an instant message from an originating application 213 and transfer a target protocol instant message to a target application 109. The communication interface 101 therefore is capable of communicating over a communication network.

The processing system 102 conducts operations of the IM interface 100. The processing system 102 receives instant messages through the communication interface 101, performs operations on the instant messages, and generates and transfers new instant messages to the communication interface 101 for transfer to the IM core server 205 or to the target application 109. In one embodiment, the processing system 102 is configured to receive the instant message in the messaging API 104, with the instant message requesting a target application transaction, select an output form in the messaging API 104 from the set of FDL forms 106 in response to the instant message, generate the target protocol instant message in a target application protocol using the output form and one or more protocol-specific libraries 105 of the messaging API 104, and transfer the target protocol instant message to the communication interface 101. The messaging API 104 is substantially protocol-dependent and the set of FDL forms 106 is protocol-independent. Due to the inclusion of the messaging API 104, an instant message received from the originating application 213 does not have to be in a target application protocol. The target protocol instant message comprises a target application protocol-specific transaction request. The communication interface 101 transfers the target protocol instant message to the target application 109. Therefore, the processing system 102 executes the messaging API 104 in order to interface with the target application 109 and/or the originating application 213. The messaging API 104 can generate an instant message to the originating application 213 and can generate an instant message to the target application 109.

The processing system 102 can include the storage system 103. The storage system 103 can comprise any manner of storage medium. The storage system 103 can store the messaging API 104, the protocol-specific library(s) 105, and the set of FDL forms 106, for example.

An API can comprise a software routine that interfaces between two or more other processes on a computer system. The API can include calls, subroutines, data formats, and software interrupts. An API is often used so that a higher-level program, such as an application program, can make use of a lower-level services and functions of another application over network services, communications programs, telephone equipment, or program-to-program communications.

One capability of an API is the capability to convert or translate digital data from a first protocol to a second protocol. All necessary protocol conversions/translations occur within the messaging API 104 according to the invention. The messaging API 104 receives an instant message from the originating application 213 (through the IM core server 205) and converts/translates it to an instant message in an appropriate protocol for the target application 109. In addition, the messaging API 104 can return a requested data to the originating application 213. Furthermore, the messaging API 104 can receive an instant message from the target application 109 and convert/translate it to an instant message in an appropriate protocol for the originating application 213. In this manner, the IM interface 100 interfaces between the originating application 213 and the target application 109 in order to relay an instant message target application transaction request to the target application 109 and return data and/or operational information to the originating application 213.

The set of FDL forms 106 are created using a Forms Definition Language. The Forms Definition Language is a programming language that can be used to create input forms for accepting inputs and can be used to create output forms for generating and displaying outputs. The FDL therefore can be used to perform a transaction in an organized, defined manner. An FDL form can specify data to be included in an instant message, such as request data transferred to the target application 109. In addition, an FDL form can specify reply data to be returned from/by the target application 109.

Unlike the prior art, the set of FDL forms 106 according to the invention is constructed in a unique, protocol-independent Forms Definition Language. The protocol of an instant message produced by the messaging API 104 depends on the included protocol-specific library(s) 105. As a result, from the protocol-independent set of FDL forms 106, the messaging API 104 can generate a target application protocol-specific message. For example, the protocol-specific library(s) 105 can comprise an eXtensible Messaging and Presence Protocol (XMPP) protocol library. Through use of protocol-independent FDL forms, the underlying protocol is hidden from the originating application 213.

The messaging API 104 can select an appropriate FDL input form in order to create a GUI display that gathers information from the user, including any protocol-dependent information that is needed to generate the protocol-specific message. The set of FDL forms 106 in one embodiment can render graphical input and output forms, as is discussed below. Such graphical forms can be implemented in order to simulate or emulate the target application 109. The actual rendering of the form is left to the IM client 211, but a software developer installing or configuring the set of FDL forms 106 on the IM interface 106 can define the appearance and layout of the forms.

Another capability of an FDL form is the ability to specify user input/output. An FDL input form can generate a graphical input interface display on a display tube or display screen of the communication device 210. In one embodiment, an FDL input form acting as a graphical input interface displays alphanumerical input entry boxes and corresponding graphical input instructions. For example, a graphical input interface can include a box for entering an employee name, and can have corresponding instructions that instruct the user as to the data to be entered into the box, the format to be used, etc. It should be understood that alternatively other graphical input methods can be employed.

An FDL output form can generate an output display. The output display can display data returned by the target application 109 according to a defined format. Consequently, the messaging API 104 can select an appropriate FDL form from among the available FDL forms when a transaction is initiated. For example, the messaging API 104 can select an employee lookup FDL form in order to perform an employee lookup.

The protocol-specific library(s) 105 comprises protocol data for one or more protocols. The protocol data is used to convert an instant message to an appropriate protocol for transmission to a particular target application 109. In addition, the protocol data is used to convert an instant message to an appropriate protocol for transmission to the IM core server 205 and the originating application 213. In this manner, the IM core server 205 can communicate with each target application, even when the target applications employ different protocols. Therefore, the protocol-specific library (s) 105 enable addition of new target applications without the necessity of changes to the IM core server 205.

One problem commonly encountered with an information exchange in the prior art is in creating instant messages that observe the protocol of the target application. Another problem is that if the protocol of the target application changes, any messaging software becomes unusable. Therefore, in order to accommodate a protocol change in the prior art, the user or software developer has to either re-write or replace the messaging software with new, protocol-correct messaging software.

Advantageously, according to the invention, the messaging API 104 can be easily and quickly modified if the protocol of a target application is changed, if the target application is changed, or if a new target application is added. To modify the messaging API 104, a protocol-dependent library(s) 105 can be modified or replaced. Alternatively, one or more new libraries can be added, extending the capabilities of the messaging API 104. The set of FDL forms 106, being protocol-independent, does not have to be changed.

FIG. 2 shows a communication system 200 according to an embodiment of the invention. The communication system 200 includes the IM interface 100, an IM core server 205, a target application 109, and a communication device 210. The IM interface 100 can interface between the IM core server 205 and multiple target applications. The communication device 210 is configured to communicate with the IM core server 205. Through the IM core server 205, the communication device 210 can communicate with and access the target application 109. The communication can be achieved over a communication network. The communication device 210 can send a message to the target application 109 over one or more communication networks in order to conduct a data exchange or to initiate an operation in the target application 109. The communication network can include the IM core server 205. In addition, the communication network can optionally include the IM interface 100 and even the target application 109.

The communication device 210 can comprise a desktop, laptop, portable, or mainframe computer, etc. Alternatively, the communication device can comprise a computerized portable communication device and/or wireless device, such as a conventional telephone, a cellular or satellite telephone, personal digital assistant (PDA), pager, etc.

One or more originating (software) applications 213 can reside on the communication device 210 and can be accessed by a user of the communication device 210. In addition, the communication device 210 includes an IM client 211. The originating application 213 creates a target application transaction request message to be sent to the target application 109 as an instant message.

The originating application 213 is a software application that generates the target application transaction request. The originating application 213 can comprise a commercially available software application or a custom software application, and can be unaware of the target application 109 and the protocol required by the target application 109. This is accomplished because the messaging API 104 seamlessly integrates the target application 109 and the originating application 213.

The IM client 211 creates and transfers an instant message to the IM core server 205 that includes the target application transaction request message. The instant message is therefore transferred by the communication device 210 to the IM interface 100 as an instant message.

The IM client 211 of the communication device 210 can optionally include an IM icon 212. The IM icon 212 can be used to create and/or translate a message into an instant message for transfer to the IM core server 205 and beyond. The IM icon 212 can substantially automate an IM transaction for the user.

The target application 109 can comprise any software application capable of being externally accessed or initiated. The target application 109 can provide data in a data exchange in response to the target protocol instant message. The target application 109 can perform an operation initiated by the target protocol instant message. The target application 109 can perform an operation to generate or obtain the data to be exchanged with the communication device 210. A target application 109 in one embodiment resides on an application server (such as the enterprise application messaging server), and such an application server can be in communication with or directly connected to the IM core server 205.

The target application 109 can communicate with application data 202 in order to generate or provide any user requested data or user requested operation. The application data 202 can include any information needed by or processed by the target application 109. The application data 202 can reside in any manner of data storage, such as a database, for example. The application data 202 can be remote from the target application 109 or can be a component of the target application 109.

The IM core server 205 (and the IM interface 100) can reside on or can comprise a component of a communication network. The communication network can comprise a wire network or a wireless network. The communication network in one embodiment comprises an IM communication network. For example, the communication network can comprise a Public Switched Telephone Network (PSTN), a cellular telephone network, a satellite telephone network, etc. Alternatively, the communication network can comprise a packet network, such as a Local Area Network (LAN), a Wide Area Network (WAN), a Virtual Private Network (VPN), the Internet, etc. In another alternative, the communication network can comprise a hybrid network including both switched and packet network portions.

The IM interface 100 can be located behind a firewall for data security. Alternatively, some manner of encryption can be used in order to ensure that the exchanged data is private. For example, in one embodiment the requests and responses are encrypted with Secure Socket Layer/Transparent LAN Service (SSL/TLS) encryption. However, other encryption types and other security measures can be employed.

The IM interface 100 can be an independent component in a communication network, as shown. Alternatively, the IM interface 100 can comprise a component of another device, such as being part of the IM core server 205 or being part of the target application 109, for example. In one embodiment, each target application 109 can include one or more IM interfaces 100.

The messaging capability according to the invention can be added to a communication system by a developer toolkit that adds the messaging API 104, the protocol-specific library(s) 105, and the set of FDL forms 106 to the IM interface 100. The developer toolkit can further add or change the protocol-specific library(s) 105 of the messaging API 104. The developer toolkit enables a developer to rapidly and easily create, import, and/or customize FDL forms. The developer toolkit can include a Graphical User Interface (GUI) for deploying the messaging API 104 into the IM interface 100.

The developer toolkit further enables the replacement, addition, or updating of the protocol-specific library(s) 105. The developer toolkit can therefore be used to modify an existing messaging API 104. This may be necessary where the target application 109 has been modified, where a new target application 109 has been selected, or where a new target application 109 has been added to the IM core server 205.

The developer toolkit further enables a developer to rapidly and easily write stub code for the messaging API 104. The stub code can perform operations such as the runtime selection of FDL forms for both the input and output processes, for example.

One example of a target application is a company employee directory software running on a company computer. A person can generate a request for an employee record from his or her communication device. In one embodiment, the person selects and executes an originating application, selects an appropriate FDL input form for an employee directory query, and enters information as dictated by the form. The input form acts as a template and guide, and can indicate input information needed in order to request various items of desired information. For example, the form can request first, middle and last names, can request an employee location or title, etc. The person can enter the requested information in a graphical or semi-graphical manner. The target application 109 processes the request and responds with the requested information. In this example, the target application 109 can respond with one or more matching employee names and corresponding information such as a telephone number, e-mail address, location/mailing address, title, etc. The messaging API 104 receives the response from the target application 109, translates it as needed, and presents the information to the person. The display of the information can likewise include an output form, wherein the output form is filled out with the received information. The output form organizes the information into a defined pattern or layout in order to facilitate comprehension. For example, the output form can present the employee name and other information, along with legends and explanations (for example, providing a legend of "fax number" before a ten-digit telephone number).

Figure 3:
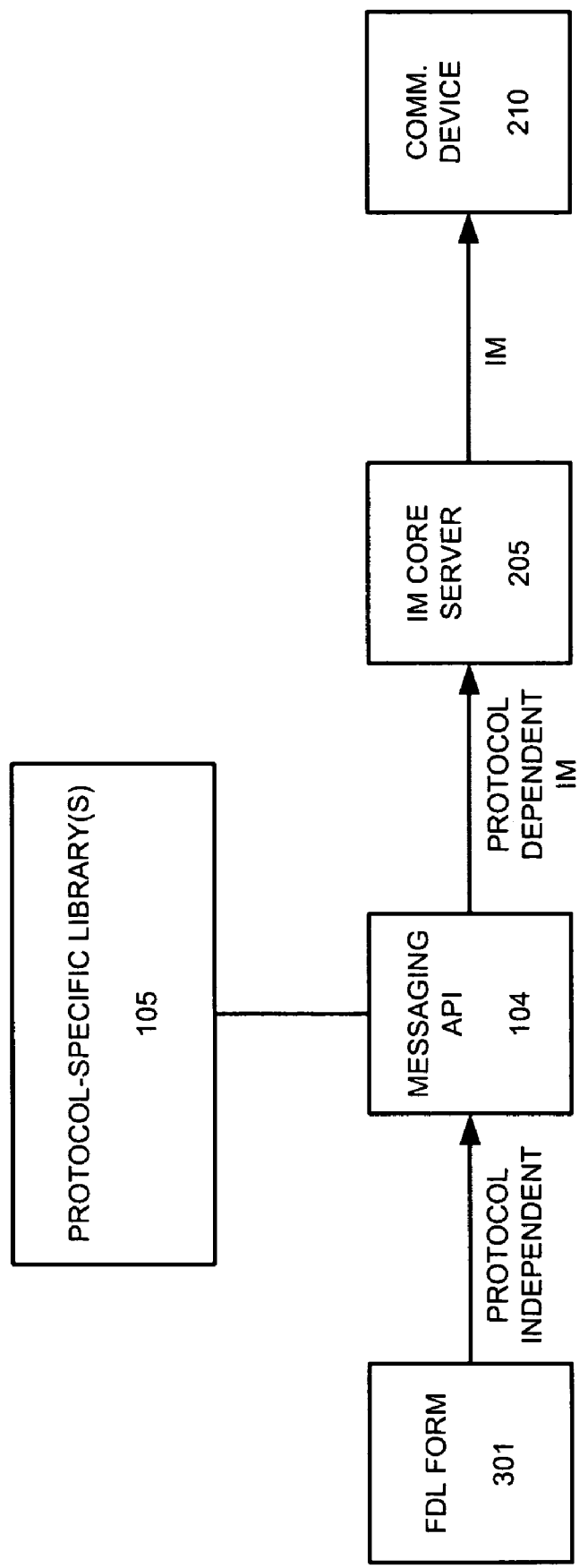
FIG. 3 shows a basic interfacing process according to an embodiment of the invention.

FIG. 3 shows a basic interfacing process according to an embodiment of the invention. A selected FDL form 301 is transferred to the messaging API 104. The selected FDL form 301 is a protocol-independent form. The selected FDL form 301 can be provided at the initiation of the target application 109 (the selected FDL form 301, the protocol-specific library(s) 105, and the messaging API 104 in one embodiment are all resident with the target application 109). The messaging API 104 uses the selected FDL form 301 to generate a data message, and further uses protocol information from the one or more protocol-specific libraries 105 in order to create a protocol-specific message. The protocol-specific message is transferred to the IM core server 205, which relays it to the communication device 210.

The IM interface 100 can operate to provide an interfacing operation in several ways. In one embodiment, the target application 109 is configured to push data to the communication device 210. In this embodiment, the target application 109 transfers data to the IM interface 100 unprompted by the user. The IM interface 100 translates the message from the target application 109 and transfers the translated message to the communication device 210 (see FIG. 4 and the accompanying discussion).

In another interfacing embodiment, a user requests data/operation from the target application 109. The IM interface 100 receives the request, performs a protocol translation, transmits the translated request to the target application 109, receives a response from the target application 109 in response to the request, translates the response back into the protocol of the originating application 213, and transfers the translated response to the communication device 210 and the originating application 213 (see FIG. 5 and the accompanying discussion). The messaging API 104 therefore interfaces between the originating application 213 and the target application 109 in both directions.

In yet another interfacing embodiment, the originating application 213 can send an output form to the target application 109 with the data/operation request. The output form can specify the data to be included in the response to the originating application 213. For example, the user can select from available data options to create a data template, wherein the data template comprises the output form that includes data and formatting chosen by the user (see FIG. 5 and the accompanying discussion).

In yet another interfacing embodiment, the IM interface 100 can receive an instant message from the originating application 213 and can send an input form back to the originating application 213. The input form requests information for a transaction request to the target application 109. The input form can specify one or more input screens or input templates that are displayed to the user, for example. The input form is therefore used to obtain data from the user of the communication device 210, with the data being used to generate an instant message that requests a target application transaction (see FIG. 7 and the accompanying discussion).

In yet another interfacing embodiment, the IM interface 100 can receive an instant message from the originating application 213 and can send data directly back to the originating application 213. In this embodiment, the data is available in the IM interface 100 and is inserted into the reply instant message by the IM interface 100.

Figure 4:
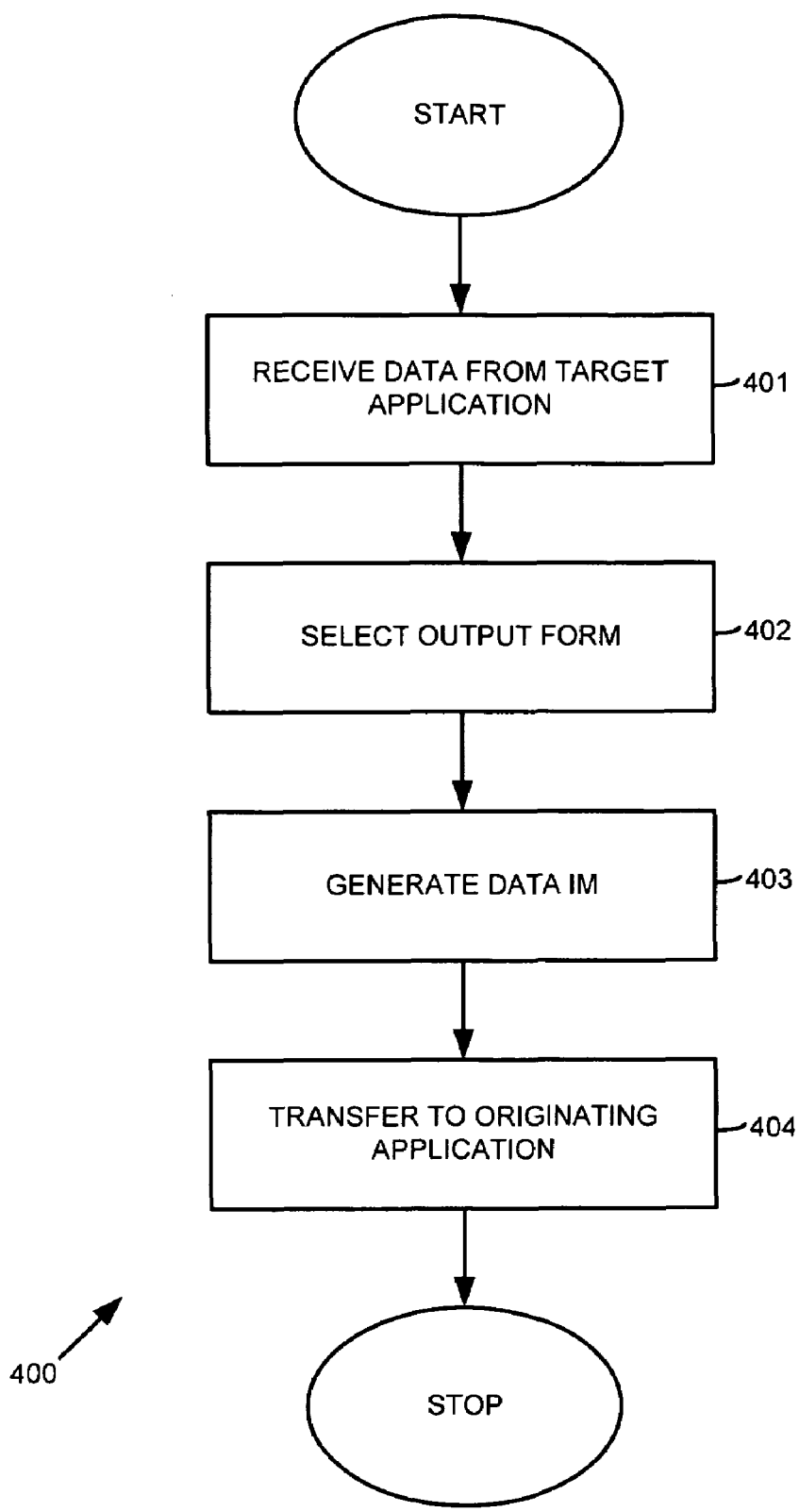
FIG. 4 is a flowchart of the operation of the IM interface according to an embodiment of the invention.

FIG. 4 is a flowchart 400 of the operation of the IM interface 100 according to an embodiment of the invention. In step 401, the IM interface 100 receives data from the target application 109. The data is pushed to the IM interface 100 by the target application 109, and no request is needed from the originating application 109.

In step 402, the IM interface 100 selects an output form from the set of FDL forms 106. The output form is used to format and ultimately present the requested data/requested transaction to the communication device 210. The output form therefore can comprise an output template.

In step 403, the IM interface 100 generates a data IM that includes the requested data. The IM interface 100 performs a protocol formatting of the data IM.

In step 404, the IM interface 100 transfers the data IM to the originating application 210. The IM interface 100 therefore pushes the data to the originating application 213 as a result of the push from the target application 109. The data IM generates a data/operation display on the communication device 201. The IM transaction request is now complete.

Figure 5:
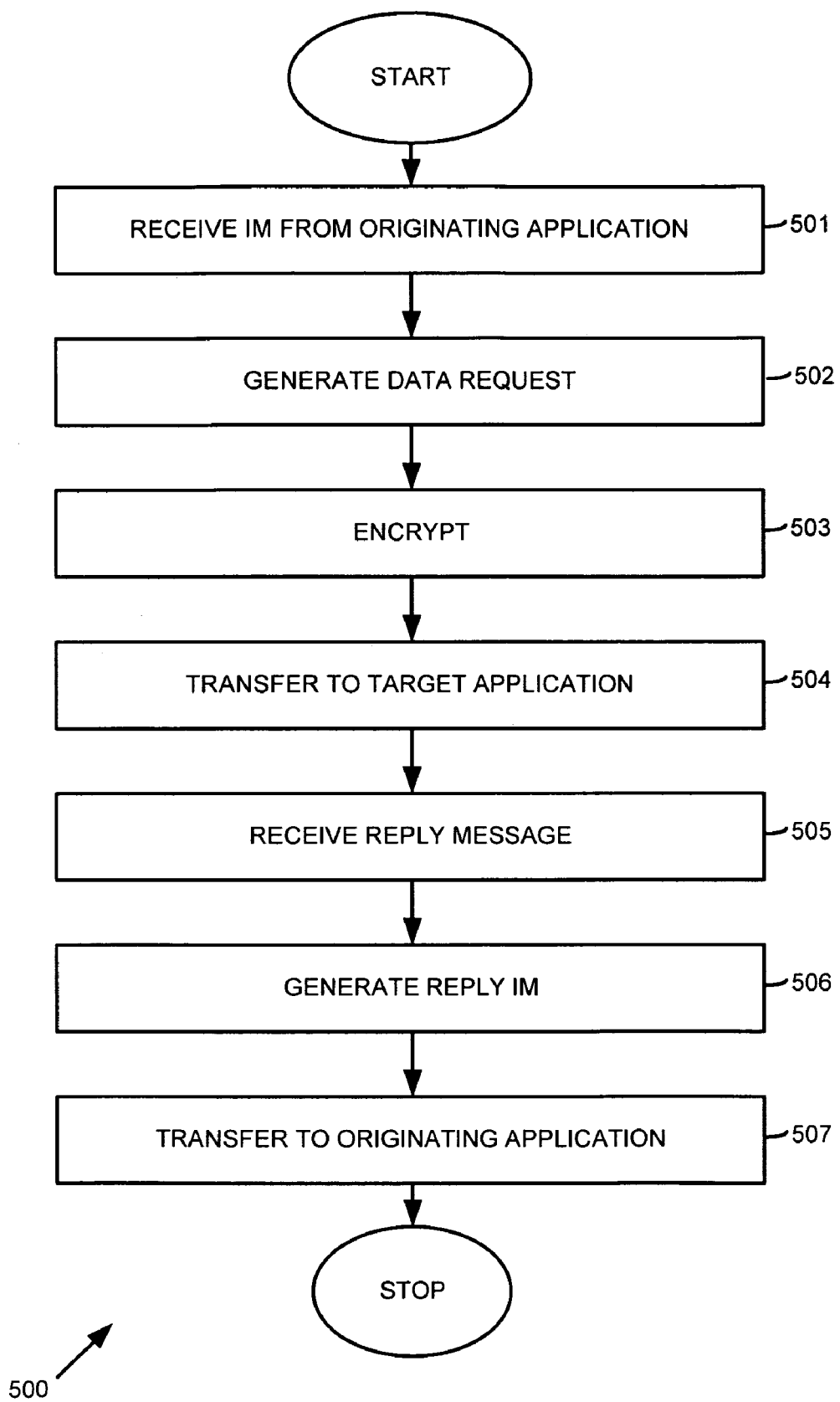
FIG. 5 is a flowchart of the operation of the IM interface according to an embodiment of the invention.

FIG. 5 is a flowchart 500 of the operation of the IM interface 100 according to an embodiment of the invention. In step 501, the IM interface 100 receives an instant message (in the messaging API 104) from the originating application 213. The instant message requests a target application transaction. Optionally, the IM from the originating application can include an FDL output form, including an output form that has at least some filled-out fields. This can occur when the originating application 213 stores an FDL form for repeated future use. The output form is used to format and ultimately present the requested data and/or the requested transaction to the communication device 210. The output form therefore can comprise an output template.

In step 502, the IM interface 100 generates a target protocol data request message in a target application protocol, using the output form and one or more protocol-specific libraries of the protocol-specific library(s) 105. The target protocol data request comprises a target application protocol-specific transaction request. If an output form is not received from the originating application 213, then the IM interface 100 can select an output form from the set of FDL forms 106.

In optional step 503, the target protocol instant message is encrypted for transmission. The encryption can comprise any available encryption type. In one embodiment, the encryption is Secure Socket Layer (SSL) encryption.

In step 504, the target protocol data request is transferred to the target application 109. The target protocol data request message is transmitted by the IM interface 100.

In step 505, the IM interface 100 receives a reply message from the target application 109 in response to the transferred target protocol data request message. The reply message includes a requested data or requested transaction supplied by the target application 109.

In step 506, the IM interface 100 generates a reply IM that comprises a communication device protocol version of the reply message from the target application 109. The IM interface 100 therefore performs a protocol conversion/translation of the reply from the target application 109.

In step 507, the IM interface 100 transfers the reply IM to the originating application 210. The reply IM generates a data/operation display on the communication device 201. The IM transaction request is now complete.

Figure 6:
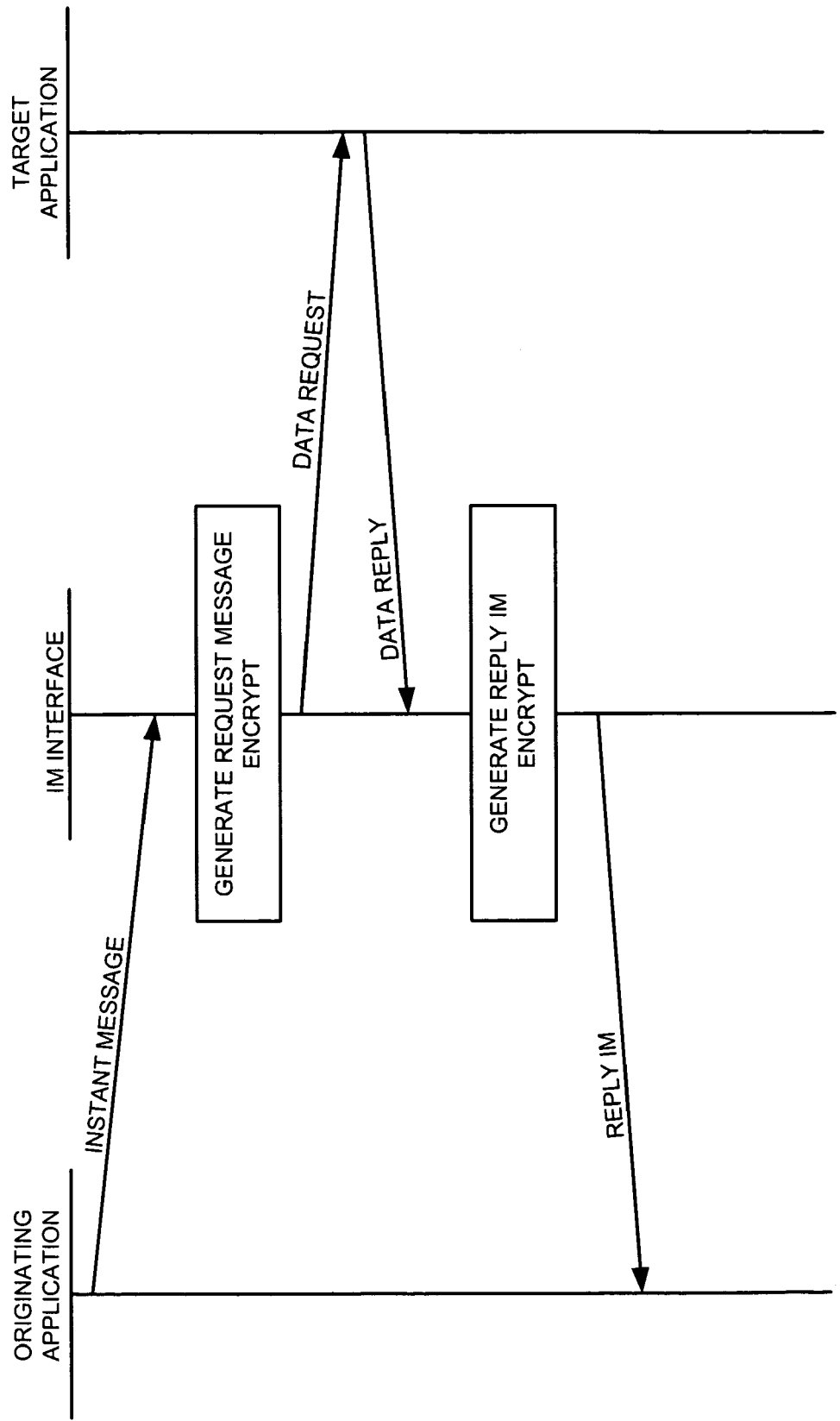
FIG. 6 is a message sequence chart that corresponds to FIG. 5.

FIG. 6 is a message sequence chart that corresponds to FIG. 5. The originating application 213 generates an instant message to the IM interface 100 (through the IM core server 205). The instant message requests a target application transaction. In one embodiment, the instant message includes an output form supplied by the originating application 213. Alternatively, the IM interface 100 in another embodiment selects an output form. Subsequently, the IM interface 100 generates a target protocol data request message corresponding to the received instant message. Upon receipt of the instant message, the IM interface 100 generates a target protocol data request message corresponding to the received instant message and using the supplied form. The IM interface 100 can optionally encrypt the target protocol data request message. The IM interface 100 transfers the target protocol data request to the target application 109. The target application 109 responds by transferring a data reply message back to the IM interface 100. The data reply message includes any requested data or operation supplied by the target application 109. The IM interface 100, upon receipt of the data reply, generates a reply IM using the supplied form and also using the data/operation supplied by the target application 109. The reply IM is therefore a protocol converted/translated version of the data reply. The IM interface 100 can optionally encrypt the reply IM. The IM interface 100 transfers the reply IM to the communication device 210, completing the target application transaction request.

Figure 7:
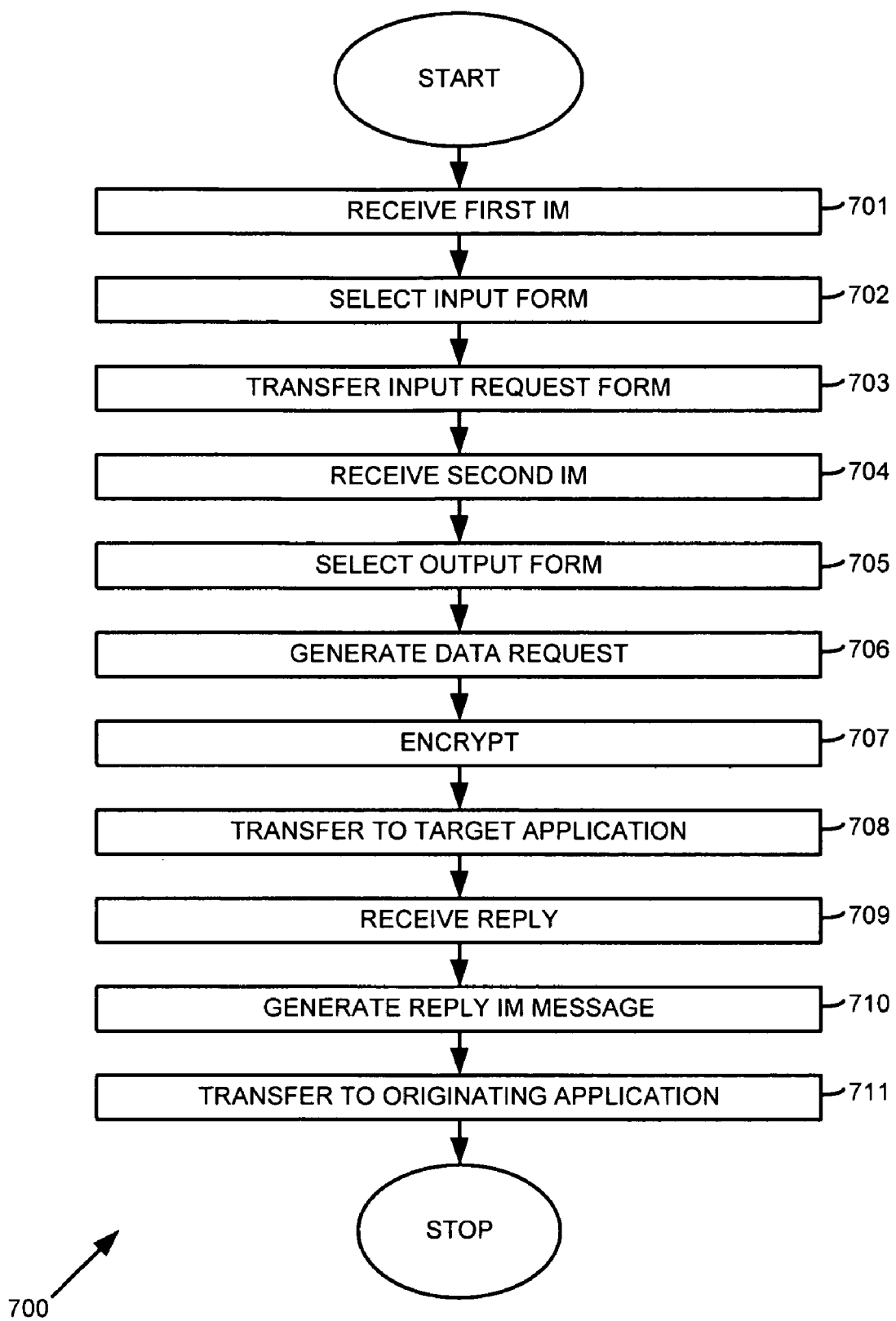
FIG. 7 is a flowchart of the operation of the IM interface according to an embodiment of the invention.

FIG. 7 is a flowchart 700 of the operation of the IM interface 100 according to an embodiment of the invention. In step 701, the IM interface 100 receives a first IM from the originating application 213. The instant message requests an input form.

In step 702, the IM interface 100 selects an input form in response to the instant message. The input form is used to generate a target application transaction. The input form can comprise an input template that requests input data from the user of the communication device 210 and subsequently formats the input data received from the user. The input form is selected from the set of FDL forms 106 in response to the request from the communication device 210.

In step 703, the IM interface 100 transfers the input form to the communication device 210. The input form can optionally be encrypted or protected by some manner of security measure.

In step 704, the IM interface 100 receives a second IM from the originating application 213, in response to the input form. The second IM requests a target application transaction, and includes data gathered in response to the input form.

In step 705, the IM interface 100 selects an output form from the set of FDL forms 106 in response to the instant message.

In step 706, the IM interface 100 generates a target protocol data request message in a target application protocol, using the output form and also using one or more protocol-specific libraries of the protocol-specific library(s) 105. The target protocol data request comprises a target application protocol-specific transaction request.

In optional step 707, the target protocol instant message is encrypted for transmission. The encryption can comprise any available encryption type. In one embodiment, the encryption is Secure Socket Layer (SSL) encryption.

In step 708, the target protocol data request is transferred to the target application 109. The target protocol data request is transferred by the IM interface 100.

In step 709, the IM interface 100 receives a reply message from the target application 109 in response to the transferred target protocol data request message. The first reply message includes a requested data or requested transaction supplied by the target application 109.

In step 710, the IM interface 100 generates a reply IM that comprises a communication device protocol version of the reply message. The IM interface 100 therefore performs a protocol conversion/translation of the reply from the target application 109.

In step 711, the IM interface 100 transfers the reply IM to the originating application 210. The reply IM generates a data/operation display on the communication device 201. The IM transaction request is now complete.

Figure 8:
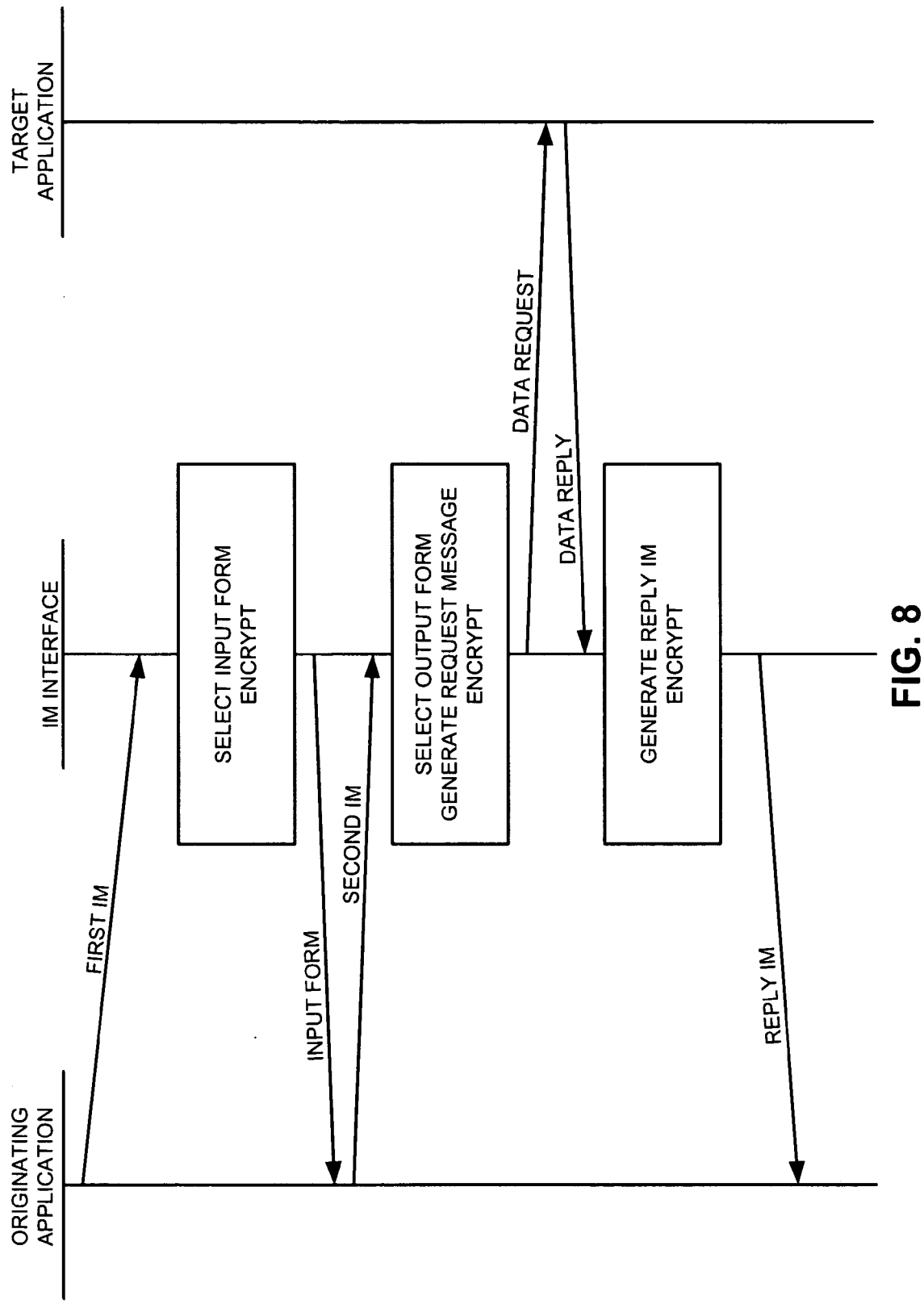
FIG. 8 is a message sequence chart that corresponds to FIG. 7.

FIG. 8 is a message sequence chart that corresponds to FIG. 7. The originating application 213 generates an instant message (i.e., the first IM) to the IM interface 100. The instant message requests an input form for a target application transaction request. The IM interface 100 selects an appropriate input form from the set of FDL forms 106. The IM interface 100 can optionally encrypt the input form. The IM interface 100 transfers the input form back to the communication device 210 and the originating application 213. The originating application 213, using the input form, generates a second instant message to the IM interface 100 that requests a target application transaction. The target application transaction includes data obtained from the user via the input form. Upon receipt of the second instant message, the IM interface 100 selects an output form and generates a target protocol data request message corresponding to the received instant message. The IM interface 100 can optionally encrypt the target protocol instant message. The IM interface 100 transfers the target protocol data request to the target application 109. The target application 109 responds by transferring a data reply back to the IM interface 100. The data reply includes any requested data or operation supplied by the target application 109. The IM interface 100, upon receipt of the data reply, generates a reply IM using the selected output form and the data/operation supplied by the target application 109. The reply IM is therefore a protocol converted/translated version of the data reply. The IM interface 100 can optionally encrypt the reply IM. The IM interface 100 transfers the reply IM to the communication device 210, completing the target application transaction request.

The messaging API 104 and the set of FDL forms 106 according to the invention can provide several benefits depending on the particular implementation. The originating application 213 can interact with the target application 109 in a protocol-invisible manner. The protocol of the target application 109 is therefore advantageously de-coupled from the originating application 213. Any necessary modifications to (or additions of) target applications 201 can be quickly and easily performed by installation of new protocol information or a new protocol library in the messaging API 104. The originating application 213 does not have to be modified due to a protocol change in the target application 109 or due to a protocol change in the IM client 211 employed by the communication device 210. In addition, the FDL forms 106 never need to be modified.

Another advantage of the messaging API 104 and the set of FDL forms 106 according to the invention is that transmitted instant messages can be easily protected by security measures. Security can be achieved by encryption of all transmitted instant messages. Security can additionally include firewall protection that restricts target application transactions to users that are inside a corporation or institution.

Yet another advantage of the messaging API 104 and the set of FDL forms 106 according to the invention is that target applications can be extended to mobile communication devices and remote communication devices. A target application 109 can be thus extended without the need for installing the target application 109 on the communication device 210. Instead, the invention enables a user to communicate with a target application 109 and access the functionality of the target application 109.

Yet another advantage of the messaging API 104 and the set of FDL forms 106 according to the invention is that graphical input and output forms can be rendered and displayed to the user. These forms can request input data and present output data in a graphical, easy-to-understand format. The graphical forms can be implemented in one embodiment to simulate or emulate the target application 109. The graphical forms can include defined fields that guide the user through input entry and provide output in an easy to understand format. The set of FDL forms 106 can define a graphical screen to be displayed by the originating application 213 and/or the communication device 210.

Yet another advantage of the messaging API 104 and the set of FDL forms 106 according to the invention is that the set of FDL forms 106 employs a generic Form Definition Language. An FDL form of the set of FDL forms 106 is therefore protocol-independent.

What is claimed is:

1. An instant message (IM) interface configured to extend a target application over an IM link of a communication network, the IM interface comprising:
   a communication interface configured to transfer a reply IM to an originating application; and
   a processing system configured to obtain data from the target application, provide an output form to a messaging Application Programming Interface (messaging API), with the output form being provided from a set of Forms Definition Language (FDL) forms, with the messaging API being protocol-dependent and with the set of FDL forms being protocol-independent, and generate the reply IM in an originating application protocol using the data, the output form, and one or more protocol-specific libraries of the messaging API, with the reply IM comprising an originating application protocol-specific IM.

2. The IM interface of claim 1, with the communication interface being further configured to receive an IM from the originating application, with the IM requesting a target application transaction and wherein the data is obtained in response to the IM.

3. The IM interface of claim 1, with the communication interface being further configured to receive an IM from the originating application, with the IM requesting a target application transaction and wherein the data is obtained in response to the IM, and with the communication interface being further configured to transfer an input request form IM to the originating application in response to the IM; and
   with the processing system being further configured to select an input form in the messaging API from a set of Forms Definition Language (FDL) forms in response to the IM and generate the input request form IM in the messaging API and using the input form and the one or more protocol-specific libraries, wherein the input request form IM requests and accepts input data related to the target application transaction.

4. The IM interface of claim 1, wherein the communication network comprises an IM communication network.

5. The IM interface of claim 1, with the processing system being further configured to encrypt the target protocol IM to create an encrypted target protocol IM.

6. The IM interface of claim 1, wherein the target application protocol comprises eXtensible Messaging and Presence Protocol (XMPP).

7. The IM interface of claim 1, with the obtaining data comprising:
   generating a target protocol data request message in a target application protocol using the output form and one or more protocol-specific libraries of the messaging API, with the target protocol data request message comprising a target application protocol-specific transaction request;
   receiving a reply message from the target application in response to the target protocol data request message;
   generating a reply IM from the reply message using the one or more protocol-specific libraries, wherein the reply IM includes target application reply data from the target application; and
   transferring the reply IM to the originating application.

8. The IM interface of claim 1, wherein the output form is selected and provided by an IM interface.

9. The IM interface of claim 1, wherein the output form is provided by the originating application.

10. A method for extending a target application over an Instant Message (IM) link of a communication network, the method comprising:
    obtaining data from the target application;
    providing an output form to a messaging Application Programming Interface (messaging API), with the output form being provided from a set of Forms Definition Language (FDL) forms, with the messaging API being protocol-dependent and with the set of FDL forms being protocol-independent;
    generating a reply IM in an originating application protocol using the data, the output form, and one or more protocol-specific libraries of the messaging API, with the reply IM comprising an originating application protocol-specific instant message; and
    transferring the reply IM to the originating application.

11. The method of claim 10, wherein the communication network comprises an IM communication network.

12. The method of claim 10, further comprising encrypting the reply IM to create an encrypted reply IM.

13. The method of claim 10, wherein the originating application protocol comprises eXtensible Messaging and Presence Protocol (XMPP).

14. The method of claim 10, wherein the output form is selected and provided by an IM interface.

15. The method of claim 10, wherein the output form is provided by the originating application.

16. A method for extending a target application over an Instant Message (IM) link of a communication network, the method comprising:
    receiving an IM in a messaging Application Programming Interface (messaging API) from an originating application, with the IM requesting a target application transaction;
    obtaining data requested in the IM;
    providing an output form to the messaging API, with the output form being provided from a set of Forms Definition Language (FDL) forms, with the messaging API being protocol-dependent and with the set of FDL forms being protocol-independent;
    generating a reply IM in an originating application protocol using the data, the output form, and one or more protocol-specific libraries of the messaging API, with the reply IM comprising an originating application protocol-specific instant message; and
    transferring the reply IM to the originating application.

17. The method of claim 16, wherein the communication network comprises an IM communication network.

18. The method of claim 16, further comprising encrypting the reply IM to create an encrypted reply IM.

19. The method of claim 16, wherein the originating application protocol comprises eXtensible Messaging and Presence Protocol (XMPP).

20. The method of claim 16, with the obtaining data comprising:
- generating a target protocol data request message in a target application protocol using the output form and one or more protocol-specific libraries of the messaging API, with the target protocol data request message comprising a target application protocol-specific transaction request;
- receiving a reply message from the target application in response to the target protocol data request message;
- generating a reply IM from the reply message using the one or more protocol-specific libraries, wherein the reply IM includes target application reply data from the target application; and
- transferring the reply IM to the originating application.

21. The method of claim 16, wherein the output form is selected and provided by an IM interface.

22. The method of claim 16, wherein the output form is provided by the originating application.

23. A method for extending a target application over an Instant Message (IM) link of a communication network, the method comprising:
- receiving a first IM in a messaging Application Programming Interface (messaging API) from an originating application, with the first IM requesting a target application transaction;
- selecting an input form in the messaging API from a set of Forms Definition Language (FDL) forms in response to the first IM, with the messaging API being protocol-dependent and with the set of FDL forms being protocol-independent;
- generating an input request form IM in the messaging API using the input form and one or more protocol-specific libraries, wherein the input request form IM requests and accepts input data related to the target application transaction;
- transferring the input request form IM to the originating application;
- receiving a second IM in the messaging API in response to the input request form IM;
- obtaining data requested in the second IM;
- providing an output form to the messaging API, with the output form being provided from the set of FDL forms;
- generating a reply IM in an originating application protocol using the data, the output form, and the one or more protocol-specific libraries of the messaging API, with the reply IM comprising an originating application protocol-specific instant message; and
- transferring the reply IM to the originating application.

24. The method of claim 23, wherein the communication network comprises an IM communication network.

25. The method of claim 23, further comprising encrypting the reply IM to create an encrypted reply IM.

26. The method of claim 23, wherein the originating application protocol comprises eXtensible Messaging and Presence Protocol (XMPP).

27. The method of claim 23, with the obtaining data comprising:
- generating a target protocol data request message in a target application protocol using the output form and one or more protocol-specific libraries of the messaging API, with the target protocol data request message comprising a target application protocol-specific transaction request;
- receiving a reply message from the target application in response to the target protocol data request message;
- generating a reply IM from the reply message using the one or more protocol-specific libraries, wherein the reply IM includes target application reply data from the target application; and
- transferring the reply IM to the originating application.

28. The method of claim 23, wherein the output form is selected and provided by an IM interface.

29. The method of claim 23, wherein the output form is provided by the originating application.

* * * * *